LOUIS C. SCHROETER
*INVENTOR.*

BY

*ATTORNEY.*

United States Patent Office 3,152,251
Patented Oct. 6, 1964

3,152,251
APPARATUS FOR AUTOMATICALLY DETERMINING ULTRAVIOLET ABSORBANCE IN A SYSTEM
Louis C. Schroeter, Kalamazoo, Mich., assignor to The Upjohn Company, Kalamazoo, Mich., a corporation of Delaware
Filed Dec. 27, 1961, Ser. No. 162,513
3 Claims. (Cl. 250—43.5)

This invention relates generally to analytical equipment and more particularly to an apparatus and method for automatically determining ultraviolet absorbance in a system undergoing change in respect to such property.

The dissolution characteristics of solid particles such as tablets or capsules are customarily determined by agitating the solids in a suitable solvent and periodically assaying the solution for drug content. Such procedures, manually performed, are time consuming and, unless carried out with considerable frequency, do not provide sufficient values for a comprehensive picture of particle dissolution as a function of time. The importance of dissolution data is becoming recognized as an essential aspect of drug availability studies. Where formerly it was regarded as sufficient to be informed of the disintegration rate of tablets or capsules, the relation of dissolution rates to absorption and hence to drug utilization is now seen to be more direct and meaningful. This invention has for one of its objects the provision of a method and apparatus for automatically determining dissolution rates of solids by spectrophotometric analysis.

A further object of this invention is to provide means and method for following the course of chemical reactions in which chemical changes as a function of time are measurable by a spectrophotometer in terms of corresponding changes in ultraviolet absorbance of the reaction product or one of the reactants being consumed. If desired, by suitably utilizing the signal output of the spectrophotometer as it detects the changing ultraviolet absorbance characteristics of the sample stream, the reaction conditions or concentration of reactants in the vessel can be changed accordingly and the reaction controlled with precision. Thus, the spectrophotometer, when employed as a component of the apparatus herein described, can, for example, deliver a plot of percent solids in solution as a function of time (dissolution rate) or can follow and control the course of a chemical reaction.

As employed hereinafter, the term "reaction" embraces both chemical reactions and physical reactions (such as dissolution of solids), in which the changes, physical or chemical, are manifest in corresponding changes in ultraviolet absorbance of the sample stream.

The usefulness of the present method and apparatus is extended by provision of means for automatically determining such properties where the sample stream absorbs ultraviolet radiation so strongly as to exceed the normal instrument response to changes in absorbance. Thus, by controlled dilution of the sample stream the concentration of the test sample is reduced as desired to permit a differential response corresponding to the changing concentration or composition throughout the reaction period. Dilution is necessary beyond about 3 density units.

Such embodiment as above described utilizes a solids dissolution or reaction vessel, hereinafter called the "reaction chamber," containing a solvent for the solids on test or the reactants or reaction product to be tested and having means for agitating the contents thereof, a liquid diluent reservoir, a spectrophotometer for measuring ultraviolet absorbance of a liquid stream, a mixing chamber for mixing the solution and the diluent, means including a pump for moving solution from the reaction chamber through the mixing chamber to the spectrophotometer at substantially constant rate, and means including a pump for moving diluent from the reservoir through the mixing chamber to the spectrophotometer at substantially constant rate. With such apparatus the ultraviolet absorbance of the thus diluted solution is measured and transmitted by the spectrophotometer as the reaction proceeds.

Alternatively, where intermittent measurements are desired, the foregoing apparatus can include, in the solution or reaction sample line, a three-way magnetic valve responsive to an electrically-operated timer. In this embodiment, solution from the reaction chamber is recirculated continuously through the three-way valve and back to the reaction chamber except for the pre-set intervals during which the timer actuates the valve to divert solution flow to the mixing chamber and thence to the spectrophotometer for periodic analysis of the diluted stream. If desired, the diluent pump may also be timer-controlled to operate only during solution diversion, as above, and for a brief period before in order to establish equilibrium conditions and a constant flow rate in the instrument and after to purge the lines and instrument of solution.

Figure 1:
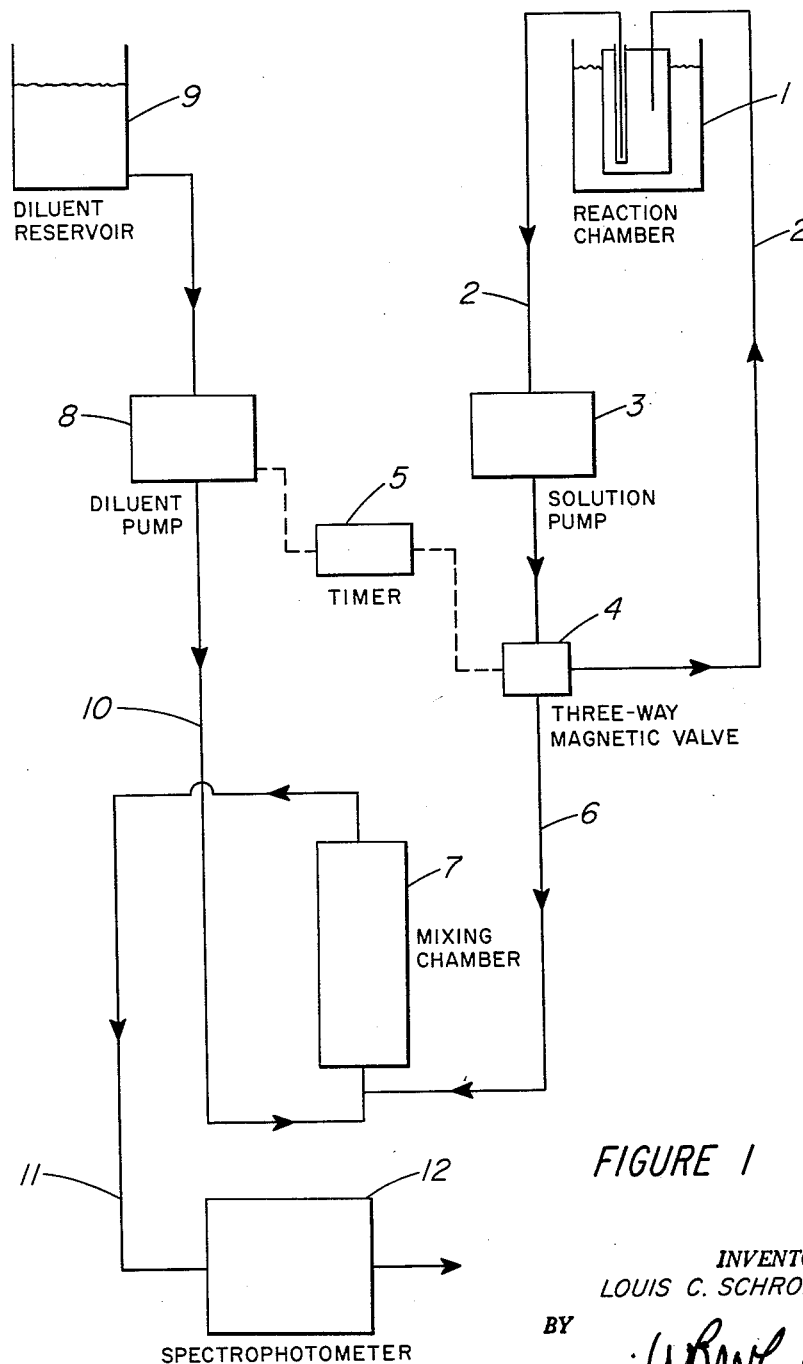
FIGURE 1 illustrates a preferred embodiment of this invention.

Accompanying FIGURE 1 illustrates a preferred embodiment of this invention as applied to the determination of solids dissolution rates. A standard U.S.P. Tablet Disintegration device or its functional equivalent is provided for reproducible dissolution of the solid particles. This device, not shown here in detail but described at U.S. Pharmacopeia XVI, pages 934–935, comprises essentially reaction chamber 1 containing the dissolution fluid or solvent and a basket-rack supporting a plurality of vertical open-ended tubes. Solids are dropped in a tube and optionally covered with a disc having holes permitting fluid exchange. Particles are placed in one or more tubes and the entire basket assembly is vertically reciprocated in the dissolution fluid. In normal operation, as dissolution proceeds, the solution is circulated in solution line 2 by pump 3 from reaction chamber 1 through three-way magnetic valve 4 and back to reaction chamber 1. In response to timer 5, three-way magnetic valve 4 periodically and for pre-set intervals diverts the normally circulating solution from reaction chamber 1 into solution line 6, which carries it to mixing chamber 7. Pump 8 moves diluent liquid from reservoir 9 through diluent line 10 to mixing chamber 7, where the diluent and solution streams are thoroughly mixed. The resulting sample stream, now comprising diluted solution, then flows through sample line 11 to spectrophotometer 12 for analysis.

Figure 2:
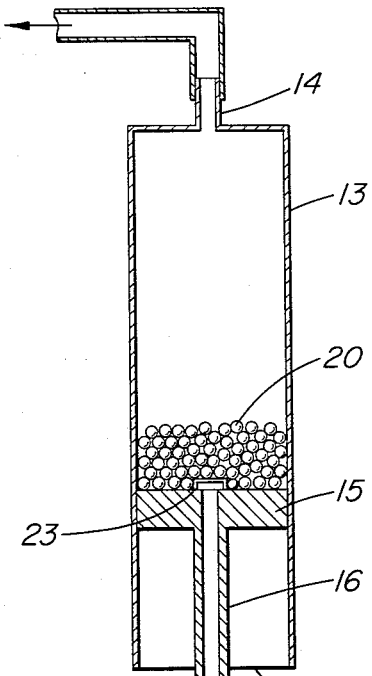
FIGURE 2 illustrates a variable volume mixing chamber.

FIGURE 2 illustrates a variable volume mixing chamber in which glass tube 13, conveniently fabricated from, for example, 2 x 15 cm. tubing, is open to full diameter at one end and terminates in nipple 14 at the other end. Extending into the full diameter open end of tube 13 is piston 15, which is reciprocally movable therein together with attached rod 16, flange 17, and nipple 18 to increase or decrease the effective volume of said tube 13. Inward travel of piston 15 is limited by flange 17 bearing against lower lip 19 of tube 13. Packing 20, comprising, for example, glass beads of about 6 mm. diameter, occupies preferably less than about one-half the enclosed volume.

Solution line 6 terminates in hollow needle 21 (for example, an 18-gauge stainless steel needle) which penetrates diluent line 7 and directs the solution stream in parallel flow with the diluent stream through channel 22 of rod 16. If desired, needle 21 can be extended through channel 22 and terminate in a right-angle bend to give additional turbulence within tube 13. Packing support 23 prevents packing from blocking channel 22.

A description of various aspects of the automated system disclosed herein follows:

DISSOLUTION OF SOLID PARTICLES

In particular where solid dosage forms of drugs are to be studied, the standard U.S.P. Tablet Disintegration device has been found to provide reliable and reproducible agitation. A 1-liter beaker is satisfactory employed as the dissolution vessel (reaction chamber 1).

Obviously, other means, such as a vessel with a baffled interior and equipped with an agitator, can be employed for this purpose. It is important only that conditions affecting the dissolution rate be reproducible and that equilibrium at all times be closely approximated throughout the contained fluid.

CHEMICAL OR PHYSICAL REACTION

Where, instead of studying the dissolution rate of solids, a chemical or physical reaction is to be followed and/or controlled, a suitable vessel is employed as reaction chamber 1 in which the components can be safely charged and samples withdrawn in the manner described. Provision is likewise made, in accord with methods well known in the art, for utilizing the output of the spectrophotometer to control reactants' flow, temperature, pressure and other variables in the involved process.

FILTERING AND CIRCULATING THE SOLUTION

To provide reliable sampling of the solution during dissolution or reaction, the sample stream is withdrawn from the reaction chamber and, unless discarded as diluted solution, is returned thereto. Preferably, a filter is inserted into the tube from which the sample is withdrawn to prevent escape of solids. A suitable filter comprises a filter tip made from a 3 x 4 cm.-sheet of No. 100 stainless steel wire cloth rolled into a cylinder with the end closed. Any filter device can be employed which is substantially inert with respect to the solution and which will effectively retain solids while permitting high flow rates.

A filtered sample of test fluid must be rapidly circulated through the spectrophotometer flow cell to give as nearly instantaneous readings as possible. Residence time of the sample in solution lines must therefore be short compared to the time required for a significant amount of drug to dissolve or reactants to react. The means employed for pumping should avoid contamination of the fluid by contact with pump surfaces and avert hold-up of large volumes of liquid. A device capable of imparting a pumping action to liquid contained in a flexible tube is preferred. Representative of this type is the Sigmamotor pump, manufactured by the Sigmamotor Company. In such units a pulsating but continually advancing motion is imparted to the liquid by the sequential pressing of metal "fingers" against the outer wall of the tubing. Small centrifugal or gear pumps having stainless steel or resistant plastic internal surfaces can also be used if provision is made for variable pumping rate control.

It is desirable that the solution lines be kept as short as possible in order to hold sample lag time to a minimum. Where external-action pumps are employed, suitable plastic or latex tubing which is resilient and yet displays a reasonable working life is used. An internal tubing diameter of approximately ⅛ in. minimizes sample lag time by reducing the volume of circulating solution. Where conventional centrifugal or gear pumps are employed, standard metal tubing, such as stainless steel, can be used.

SPECTROPHOTOMETER

The automated measurement of ultraviolet absorbance may be accomplished for those materials which possess the requisite chromophoric groups by automatically and continuously recording the absorbance of the solution flowing through the spectrophotometer flow cell. If desired, a non-recording spectrophotometer can be combined with an optical density converter which will amplify the electrical signal from the photodetector tube so as to permit its recording. This will avoid committing a recording spectrophotometer to a single application. A recorder with a chart-speed selector will adapt the foregoing combination for direct recording of the dissolution rate curve or progress of a reaction as a function of time.

INTERMITTENT SAMPLING

The apparatus described above can be given increased versatility, as hereinbefore noted, to accommodate solutions having an absorbance beyond the instrument response by the incorporation of a sample-dilution arrangement as shown in FIGURE 1. Thus, introduction of the three-way magnetic valve into the solution stream serves as a means for diverting a fixed, small volume into the diluent stream. The solenoid valve should preferably have a minimum orifice of $\frac{1}{16}$ in. to minimize sample retention. By signal from a timer the valve is actuated according to the pre-selected sampling interval.

The proper timing sequence of valve operation can be provided by any timer or series of timers which will, at predetermined intervals of about ½ to 5 minutes, open for a period of about ½ to 5 seconds and then close the valve. The timer should then automatically reset and repeat the sequence.

MIXING

The diverted sample from the solenoid valve is injected into the diluent stream which is likewise flowing at a constant rate. Since streamlined flow does not produce sufficient mixing for reproducible dilution, a turbulent flow mixing chamber is preferred as a means for achieving thorough mixing. Provision such as that hereinbefore described for varying the volume in the mixing chamber to accommodate the particular solution under study lends further versatility to the system. Actual introduction of the solution stream into the diluent stream can take place at any convenient point, and it is obvious that mixing devices of various descriptions can be employed to achieve a homogeneous stream entering the spectrophotometer flow cell. Experience has shown, however, that the most reproducible mixing is achieved with a vertical, partially-packed chamber wherein sample and diluent streams enter the bottom and emerge as a single stream from the top. It is not necessary to know the exact dilution factor so long as constant pumping rates are maintained throughout the reaction because all measurements are relative.

DILUENT

Controlled flow of diluent from the diluent reservoir can be accomplished with a hydrostatic device constructed from a 500-ml. separatory funnel with a side-arm tube for overflow. Adjusting the height of the liquid level permits accurate control of diluent flow. It is preferred, however, to employ a positive pumping device, such as the Sigmamotor unit described above, for moving the diluent stream. If desired, the same externally operating pump utilized for the solution stream can be employed for the diluent stream, since this pumping device will accommodate tubing at both ends of the actuating "fingers." Independent tension adjustments for different diameter tubes for the two streams permits the use of independent pumping rates.

The diluent fluid normally flows continuously through the spectrophotometer flow cell. However, conservation of diluent can be effected by intermittent timer-controlled operation of the diluent pumping system. A multiplecircuit timer controlling both the solenoid valve and diluent pump can provide, for example, the following operating sequence: (1) diluent pump on; (2) 15 to 20-second interval; (3) valve open; (4) ½ to 5-second interval; (5) valve shut; (6) 15 to 30-second interval; (7) diluent pump off; (8) 60 to 300-second interval; (9) repeat cycle. Operating the diluent pump for a period of at least five residence times (15 seconds) permits flushing of lines and taking a representative sample from the reaction chamber. The pump should run a minimum of 15 to 30 seconds after sampling to flush the mixing chamber and spectrophotometer flow cell.

The following examples illustrate the operation of an automated sampling and dilution system according to this invention with, respectively, continuous and intermittent circulation of diluent:

*Example 1.—With Continuous Circulation of Diluent*

One tablet containing aspirin, phenacetin and caffeine was dissolved completely in 750 ml. of pH 1.35 buffer (0.05 N hydrochloric acid with sodium chloride added to give ionic strength of 0.1) by equilibrating at 37.5° C. for 1 hour. Absorbance of the undiluted solution was 23.6 at the wave length of maximum absorption, which was a composite of the three chromophores. This indicated the need for an effective dilution of twenty times to give a measurable absorbance. Solution stream flow rate was regulated to 1 ml. per second and the timer adjusted to send a ½-second signal (0.5 ml. sample) to the three-way magnetic valve every 1.7 minutes. Volume of the sampling line and valve was 4.1 ml. and sample lag time was 4.1 seconds. The wave length of the absorption maximum (230 m$\mu$) of the dissolved mixture in pH 1.35 buffer was selected on the monochromator. The recorder was balanced to give a maximum response of 100 units (100% drug in solution) by manipulating the flow rate of pH 1.35 diluent and adjusting the turbulent flow mixing chamber volume. The sampling system was flushed with pH 1.35 buffer and connected with a vessel containing 750 ml. of pH 1.35 buffer maintained at 37.5° C.

Figure 3:
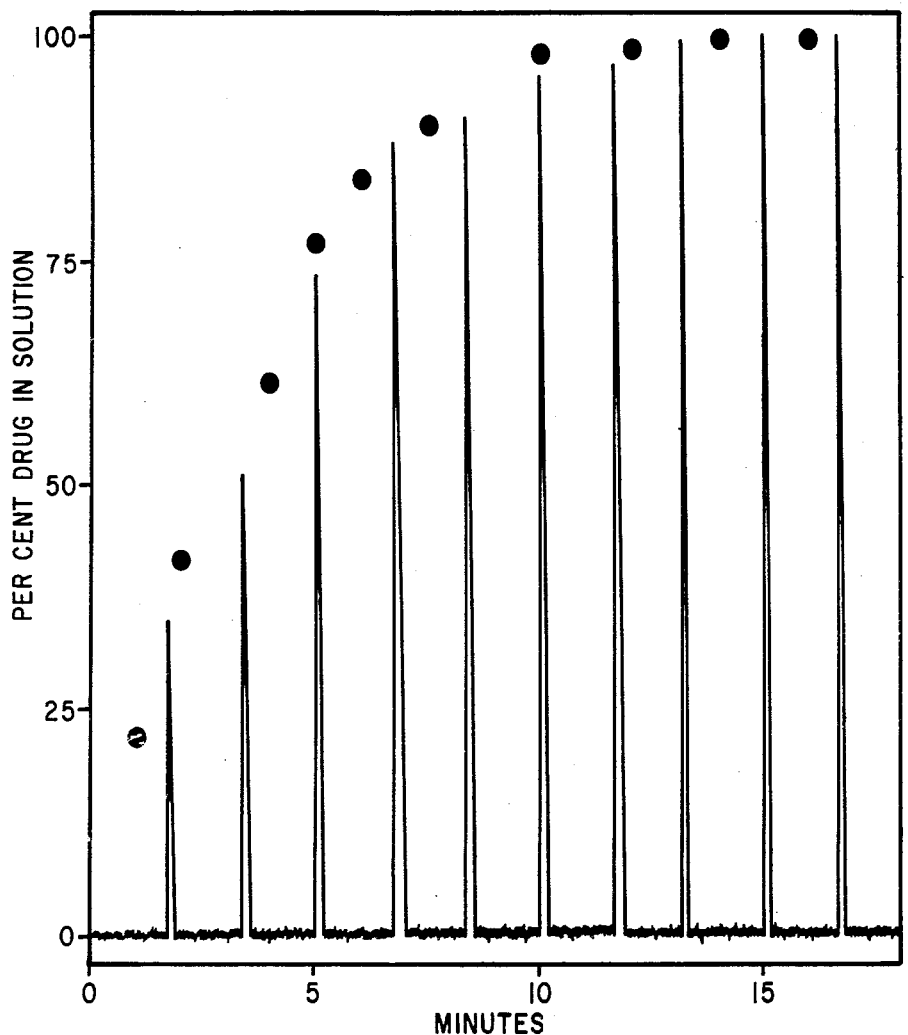
FIGURE 3 illustrates graphically the percent of drug in solution over a period of time.

One tablet was placed in a tube (without disc) of the U.S.P. Tablet Disintegration device and immersed in the buffer solution and agitated at a constant rate of 30 cycles per minute. Introduction of the tablet into the buffer marked zero time for the process. Reproduction of the curve produced by the recorder is shown in FIGURE 3. The heights of the solid vertical lines represent instrumental response in terms of percent drug in solution.

It is seen that absorbance of the solution flowing through the cell rapidly returns to zero as the diluted sample is flushed therefrom with diluent. The flow cell serves both as a sample cell and a blank cell since the diluent stream constantly flushes through, thereby assuring reliability of measurements made over long periods. The inherent reliability of the automated system is shown by the close fit of peak heights obtained with the automated procedure of this invention to the individual points obtained by independent analysis on tablets from the same lot.

*Example 2.—Without Continuous Circulation of Diluent*

Two tablets of a sulfonylurea product were dissolved in 750 ml. of 0.1 N tris(hydroxymethyl)aminomethane (hereinafter designated "THAM") buffer (pH 7.2) by equilibrating with stirring at 37.5° C. for 1 hour. Complete solution of the drug content of the tablets corresponds to 100% drug in solution or 1000 mg. of drug dissolved in 750 ml. of buffer. Absorbance of the undiluted solution was 65 at the wave length of maximum absorption, thus indicating the need for an effective dilution of from thirty to fifty times. The sample flow rate was maintained at 1.0 ml. per second and the timer adjusted to start the pump 15 seconds before sending a signal to the valve and to continue pumping 15 seconds thereafter. The timer was adjusted to send a ½-second (0.5 ml. sample) signal to the solenoid valve every 60 seconds. Volume of the sampling lines and valve was 3.5 ml. The time required for a sample to complete the circuit from the dissolution vessel and return was 3.5 seconds. The monochromator was adjusted to provide monochromatic radiation at the absorption maximum of the sulfonylurea in pH 7.2 THAM buffer (228 m$\mu$). The recorder was balanced to give a maximum response of 100 units (arbitrarily marked as 1000 mg.) by manipulating the flow rate of diluent and adjusting volume of the mixing chamber. The sampling system was flushed with fresh pH 7.2 THAM buffer and connected with a vessel containing 750 ml. of pH 7.2 THAM buffer maintained at 37.5° C.

Figure 4:
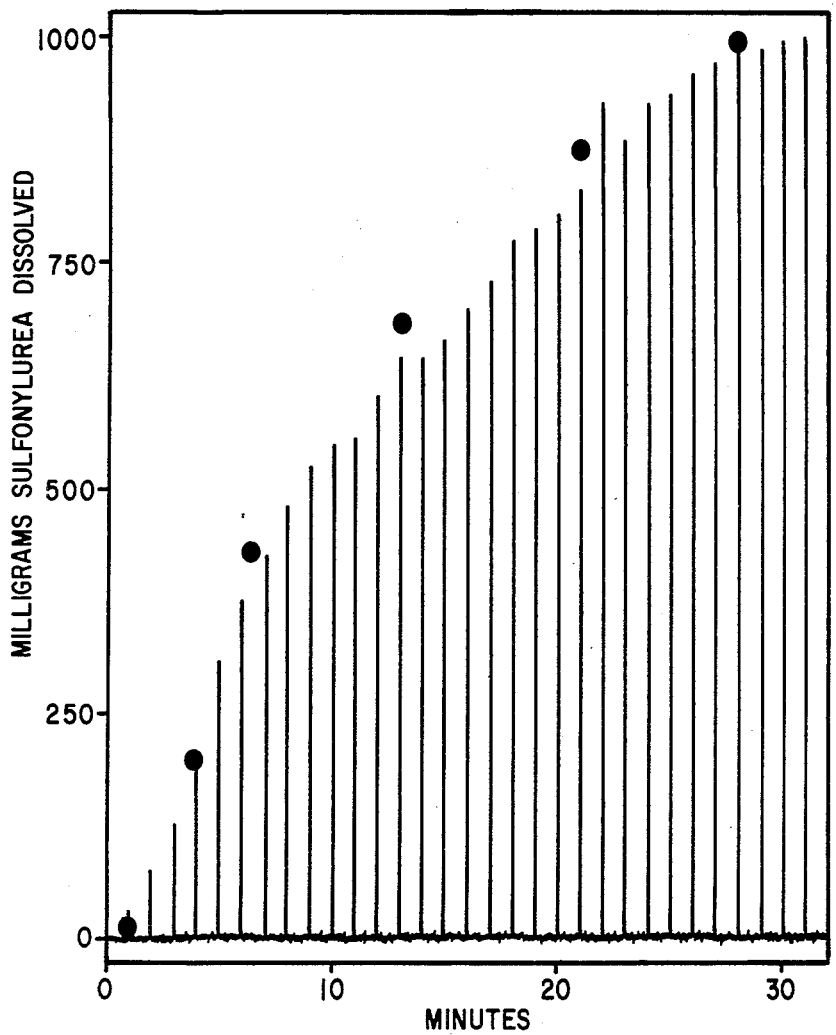
FIGURE 4 illustrates graphically the amount of drug in solution over a period of time.

Two tablets were placed in a tube (without disc) of the U.S.P. Tablet Disintegration device and immersed in the buffer solution. This marked zero time on the recorder. Reproduction of the curve obtained from the recorder is shown in FIGURE 4. The heights of the solid vertical lines represent instrumental response in terms of amount of drug in solution. Absorbance of the solution rapidly returns to zero as the diluent stream passes through the cell, thereby serving as an in-process instrument check. Results of analyses of solution concentration at various times during dissolution by an independent spectrophotometric method are represented by the individual points, which serve to validate the results of the test.

While the foregoing examples relate to determination of dissolution rates of solids, it is obvious that the procedures exemplified apply equally to the determination of other physical action rates and to observation and control of the progress of chemical reactions. Thus, by utilizing the vessel containing the U.S.P. Tablet Disintegration device as a container for the reaction, or replacing such vessel with a more specifically suited reaction chamber, and, if desired, introducing the necessary feedback equipment for controlling reactant flow, temperature, pressure and the like, the basic apparatus is readily adapted to the enlarged function.

What is claimed is:

1. An apparatus for the automated determination of ultraviolet absorbance of liquid streams comprising: in combination,
    (1) a reaction chamber;
    (2) a reservoir containing diluent for diluting the solution stream from said reaction chamber;
    (3) a spectrophotometer for measuring ultraviolet absorbance of said solution;
    (4) a mixing chamber for mixing said solution and said diluent;
    (5) means including a pump for moving said solution from said reaction chamber through said mixing chamber to said spectrophotometer at substantially constant rate, and
    (6) means including a pump for moving diluent from said reservoir through said mixing chamber in contact with said solution to said spectrophotometer at substantially constant rate, whereby the ultraviolet absorbance of the thus diluted solution is measured and transmitted by the spectrophotometer as the reaction proceeds.

2. An apparatus for the automated determination of ultraviolet absorbance of liquid streams comprising: in combination,
    (1) a reaction chamber;
    (2) a reservoir containing diluent for diluting the solution from said reaction chamber;
    (3) a spectrophotometer for measuring ultraviolet absorbance of said solution;
    (4) a mixing chamber for mixing said solution and said diluent;
    (5) means including a pump for moving said solution from said reaction chamber at substantially constant rate;
    (6) a timer-responsive three-way magnetic valve in the solution line normally permitting recirculation of said solution to said reaction chamber and periodically, for pre-set intervals, diverting said solution through said mixing chamber to said spectrophotometer, and (7) means including a pump for continuously circulating said diluent at substantially constant rate through said mixing chamber in contact with said solution to said spectrophotometer, whereby periodically the ultraviolet absorbance of the thus diluted solution is measured and transmitted by the spectrophotometer as dissolution proceeds.

3. An apparatus for the automated determination of ultraviolet absorbance of liquid streams comprising: in combination, (1) a reaction chamber;
(2) a reservoir containing diluent for diluting the solution from said reaction chamber;
(3) a spectrophotometer for measuring ultraviolet absorbance of said solution;
(4) a mixing chamber for mixing said solution and said diluent;
(5) means including a pump for moving said solution from said reaction chamber at substantially constant rate;
(6) a timer-responsive three-way magnetic valve in the solution line normally permitting recirculation of said solution to said reaction chamber and periodically, at pre-set intervals, diverting said solution through said mixing chamber to said spectrophotometer;
(7) means including a timer-responsive pump for intermittently circulating said diluent at substantially constant rate through said mixing chamber to said spectrophotometer, said diluent pump being actuated a sufficient interval prior to opening of said three-way valve to permit establishing a uniform diluent flow rate through said spectrophotometer and a sufficient interval after to purge solution therefrom, whereby periodically the ultraviolet absorbance of the thus diluted solution is measured and transmited by the spectrophotometer as the reaction proceeds.

References Cited in the file of this patent
UNITED STATES PATENTS

| | | |
|---|---|---|
| 2,540,780 | Gabel et al. | Feb. 6, 1951 |
| 2,976,761 | Whitehead et al. | Mar. 28, 1961 |
| 2,977,199 | Quittner | Mar. 28, 1961 |
| 2,984,988 | Berger et al. | May 23, 1961 |